United States Patent [19]

Jones et al.

[11] Patent Number: 5,666,501

[45] Date of Patent: Sep. 9, 1997

[54] METHOD AND APPARATUS FOR INSTALLING SOFTWARE

[75] Inventors: Timothy Leonard Jones; Paula Jean Moreland, both of Austin, Tex.

[73] Assignee: International Business Machines Corporation, Armonk, N.Y.

[21] Appl. No.: 413,315

[22] Filed: Mar. 30, 1995

[51] Int. Cl.$^6$ .......................... G06F 15/00; G06F 12/00; H01J 13/00

[52] U.S. Cl. ............... 345/348; 395/200.52; 395/500; 395/712

[58] Field of Search ....................... 395/155, 157, 395/159, 161, 500, 703, 712, 200.1, 653; 364/946.7, 949.4, DIG. 2, DIG. 1

[56] References Cited

U.S. PATENT DOCUMENTS

| | | |
|---|---|---|
| 4,558,413 | 12/1985 | Schmidt et al. . |
| 4,974,149 | 11/1990 | Valenti . |
| 5,008,814 | 4/1991 | Mathur . |
| 5,142,680 | 8/1992 | Ottman et al. . |
| 5,247,683 | 9/1993 | Holmes et al. ................ 395/700 |
| 5,313,635 | 5/1994 | Ishizuka et al. . |
| 5,361,360 | 11/1994 | Ishigami et al. ............... 395/700 |
| 5,394,522 | 2/1995 | Sanchez-Frank et al. ........ 395/159 |
| 5,421,009 | 5/1995 | Platt ............................. 395/600 |
| 5,491,783 | 2/1996 | Douglas et al. ................ 395/159 |
| 5,491,791 | 2/1996 | Glowny et al. ................ 395/183.13 |
| 5,491,795 | 2/1996 | Beaudet et al. ................ 395/159 |
| 5,497,455 | 3/1996 | Suga et al. ..................... 395/159 |
| 5,497,479 | 3/1996 | Hornbuckle ................... 395/491 |
| 5,499,357 | 3/1996 | Sonty et al. .................... 395/500 |
| 5,528,490 | 6/1996 | Hill ............................... 364/403 |

OTHER PUBLICATIONS

"Concurrent Host Installation from a Programmable Workstation", IBM Technical Disclosure Bulletin, vol. 36, No. 9A, Sep. 1993, pp. 523–524.

*Primary Examiner*—Mark R. Powell
*Assistant Examiner*—Ba Huynh
*Attorney, Agent, or Firm*—Richard A. Henkler; Jack V. Musgrove; Andrew J. Dillon

[57] ABSTRACT

A computer-implemented method, apparatus, memory embodying computer-readable code for installing software stored on a second machine to a first machine in a distributed computing network is provided. The first machine includes at least a display, processor, and user controls. The method includes the steps of displaying available, installable source objects of a second machine embodying software that is installable on a first machine, displaying software bundle objects having software items, wherein at least one software item is in common with one of the software items in the selected source object in response to a selection by user controls of at least one source object, and installing on the first machine an intersection of the first software items and the second software items.

8 Claims, 4 Drawing Sheets

METHOD AND APPARATUS FOR INSTALLING SOFTWARE

BACKGROUND OF THE INVENTION

1. Field of the Invention

The present invention relates to graphical user interfaces and, more particularly, but without limitation, to an architecture for a graphic network pull install interface.

2. Background Information and Description of the Related Art

A network user typically desires to install software from a remote location to his/her local machine. Therefore, developers have created conventional software installation packages within the local machine to allow for remote software installation. However, those conventional software packages have certain disadvantages and limitations. For example, to successfully use the installation packages, the local machine must know the network's topology, the remote machine's type and configuration, the commands necessary to initiate the install, the names of the directories and files to be installed, and the location/type of source media containing the software to be installed. Typically, the software installation package prompts the user for this information.

Further, the local machine must follow specific installation steps in sequence without error to ensure proper installation. Therefore, there is no mechanism for recovery or detection of an error during the installation process. Additionally, conventional installation packages do not provide a means for tracking the latest versions of software. Rather, the user must query the operating system to determine the latest version of software. Moreover, conventional installation packages do not have inherent mechanisms for ensuring security. As such, if a local machine has access to a remote machine, the system administrator is burdened with ensuring that the proper restrictions are in place so that the user only has access to the software s/he needs to install and has no other file access on the remote machine. In addition to administrative tasks that protect the file structure of the remote machine, there are organizational tasks that the system administrator must perform, including repetitively issuing installation steps to each type of remote machine requesting software and scheduling a time for the installation to occur on each one of the remote machines. Although none of these aforementioned tasks are difficult for an experienced system administrator, they are tedious and, therefore, error prone.

Accordingly, there is a great demand for a user interface that not only presents the software available for selection by the user from the remote machine, but also provides the most efficient setup path for the system administrator managing the remote machine. To meet these demands, this user interface should provide a mechanism for detecting and recovering from errors during the installation process, provide a means for grouping the software and for tracking the latest versions of installed software, for including inherent mechanisms to ensure security, and for scheduling the installation.

SUMMARY

A computer-implemented method, apparatus, and memory embodying computer-readable code install software located on a second machine to a first machine in a distributed computing network. The first machine includes at least a display, processor, and user controls. The method includes the step of displaying installable software residing in one or more source objects of the second machine that is installable on the first machine. In response to a selection by user controls of at least one of the displayed source objects, the method also includes the step of displaying software bundle objects having software items, where at least one of the software items is in common (i.e., identical) with one of the software items in the selected source object. If one of the software bundle objects is selected, the method further includes the step of installing on the first machine an intersection (i.e., "ANDING" in boolean logic) of the software items of the source object and the software items of the selected bundle object.

Therefore, it is an object of the present invention to provide a user interface that iconically presents all software from one or more remote machines that is available for installation on a local machine.

It is a further object to provide a user interface that detects and recovers from errors during the installation process.

It is another object to provide a user interface that groups (i.e. bundles) available software and tracks the latest versions of installed software.

It is yet another object to provide a user interface that includes inherent mechanisms to ensure security during a software installation.

It is a further object to provide a user interface that allows for the scheduling of software installation.

These and other objects, features, and advantages will become even more apparent in light of the following detailed description and drawings.

DETAILED DESCRIPTION OF THE PREFERRED EMBODIMENT

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
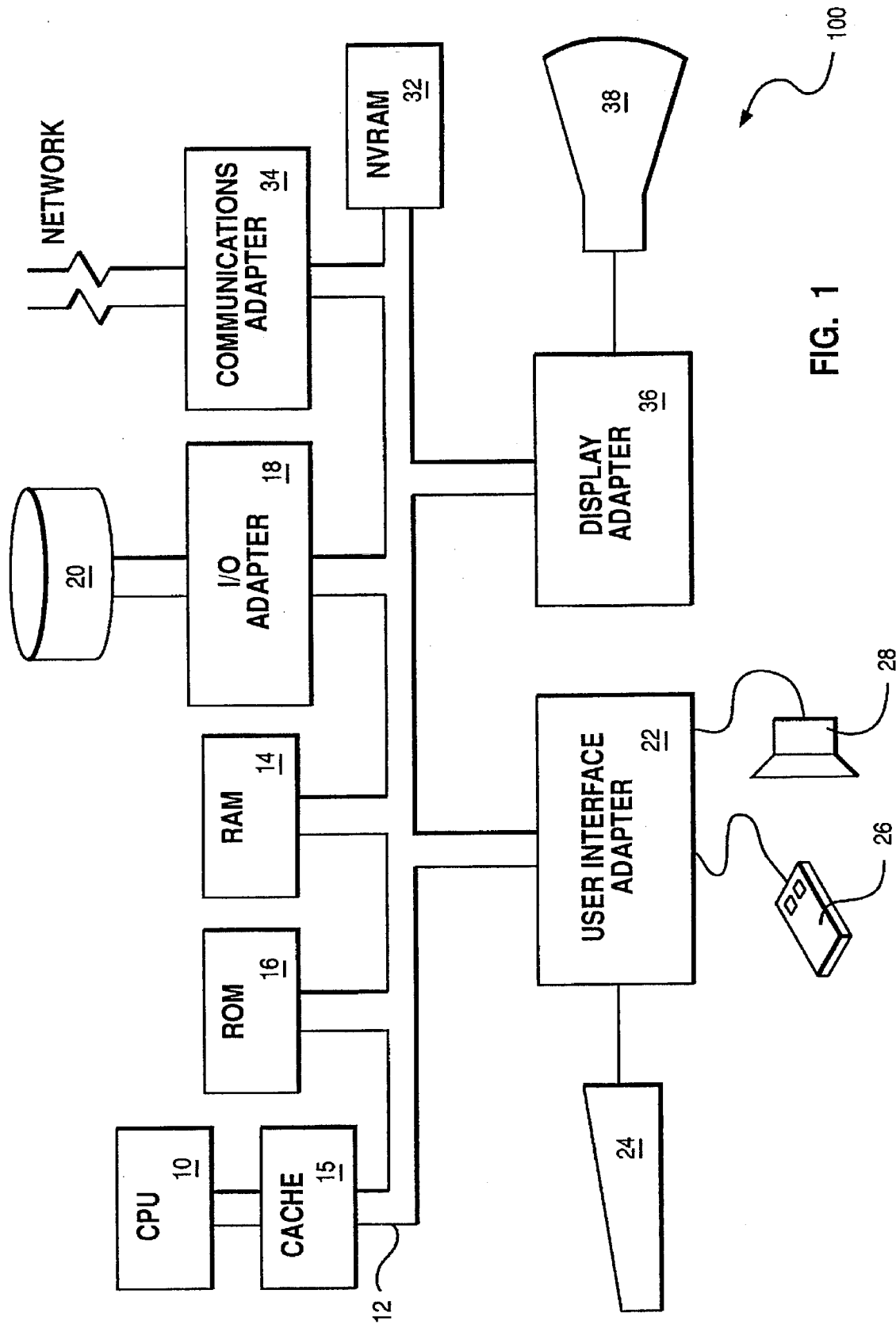
FIG. 1 illustrates a suitable representative hardware configuration for implementing the present invention.

The present invention includes a computer-implemented method, uniquely programmed computer system, and memory embodying computer-readable detailed logic for directing a local computer system to install selected software from a remote machine. The preferred embodiment is practiced in any suitable hardware configuration, such as a laptop computer or, alternatively, in the hardware configuration shown in FIG. 1. Workstation 100 includes any suitable central processing unit (CPU) 10, such as a PowerPC™ 601, and a number of other units interconnected via system bus 12. Illustratively, workstation 100 includes random access memory (RAM) 14, cache 15, read only memory (ROM) 16, nonvolatile random access memory (NVRAM) 32, display adapter 36 for connecting system bus 12 to display device 38, and I/O adapter 18 for connecting peripheral devices, such as disk drives 20 to system bus 12.

Workstation 100 further includes user interface adapter 22 for connecting user controls (e.g., keyboard 24, mouse 26, speaker 28, and/or other user interface devices, such as a touch screen device) to system bus 12. Communication adapter 34 connects workstation 100 to a data processing network having additional workstations. Any suitable operating system (OS) may direct the operation of workstation 100, such as Apple's Macintosh™ System 7 OS, IBM's OS/2™, or Microsoft's Windows NT™. However, in the preferred embodiment, IBM's AIX operating system (herein OS) controls workstation 100. For ease in explanation, this description will describe a graphical user interface (herein GUI) of the OS as performing various functions and features. However, in actuality, the GUI merely directs CPU 10 to perform those functions and features.

Figure 2:
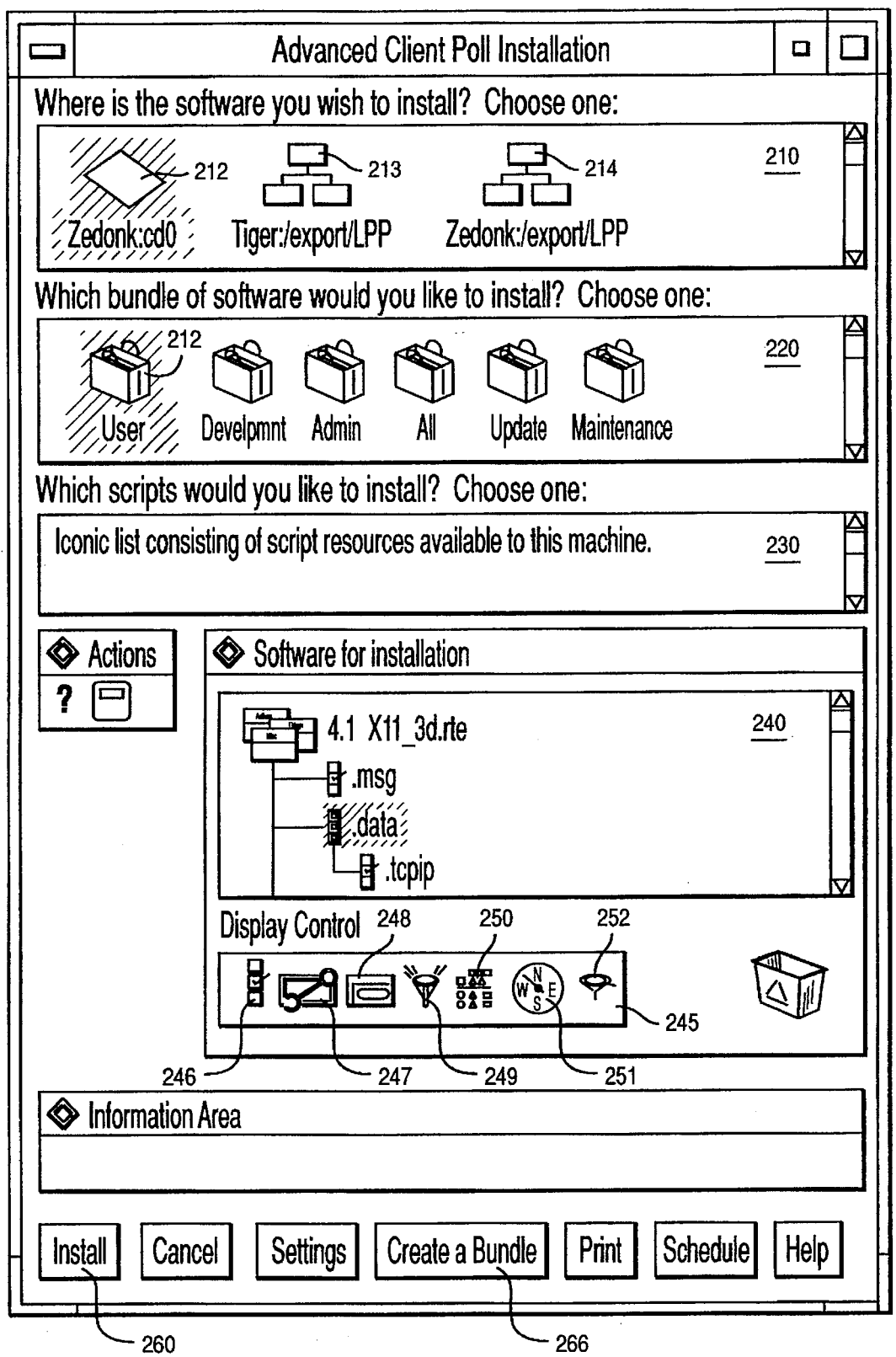
FIG. 2 is a pictorial view of the graphical user interface display in accordance with the present invention.

FIG. 2 illustrates a pictorial view of a graphical user interface (GUI) for enabling a user (i.e., local machine) to perform a network pull install. Panel 210 displays icons representing various software stored on a variety of source media (e.g., source objects) embodied within remote machines and/or the local machine. For example, assuming the GUI is being displayed on a local machine named Zedonk, icon 212 represents a CD ROM on the local machine, icon 213 represents a directory located on a remote machine named Tiger, and icon 214 represents a local directory. The user may select one or more source objects by clicking a mouse pointer over the desired icon(s).

Panel 220 illustrates various bundles of software embodied within the chosen source media. Typically, each bundle contains a list of software items embodied as a subset of the selected source object. This can be thought of as a high-level grouping of the source media. However, the bundle can also contain installable software items that are located on separate source objects. Therefore, a given bundle can be either a subset or a superset of a particular source object, depending on whether all the software items listed in the bundle are available on the particular source object.

In this example, the user selected CD ROM icon 212. As a result, the GUI displays the software items contained within the CD ROM in panel 240, and displays the bundles in panel 220. Each bundle contains at least one software item embodied within that CD ROM. The user may select one or more bundles of software via user controls (e.g., a mouse pointer). In this example, the user selected user bundle 222 and, as a result, the GUI highlights the software items contained within both the CD ROM and bundle 222 in panel 240. Therefore, the user may install the entire CD ROM or may individually select various software items of the CD ROM by selecting a user bundle 222. Alternatively, the user may individually scroll through panel 240 and make selections via user controls.

Panel 230 allows the system administrator to create custom shell scripts. Shell scripts include a batch file containing a collection of commonly issued commands to accomplish a particular task. Shell scripts could, for example, provide additional instructions for completing an installation.

Display controls 245 allow user control and manipulation of the contents of panel 240. The user can apply the controls to a single item in panel 240, the highlighted (selected) items in panel 240, or all items in panel 240. For example, display control 246 filters the items in panel 240 to show only software for which all prerequisites are satisfied. Display control 247 expands the items in panel 240 to show any fixes available (a fix is a corrective update to the software after its initial release). Display control 248 expands the items in panel 240 to show available product options (a product option is a part of installable software that can be installed but is not necessary to install for the software to work). Display control 249 expands the items in panel 240 to show any enhancements available (an enhancement is an update to add additional features to software after its initial release). Display control 250 allows the user to sort the contents of panel 240 by type, date, name, or any other attribute. Display control 251 allows the user to search the contents of panel 240 based on type, date, name, or any other attribute. Display control 245 allows the user to filter the contents of panel 240 based on type, date, name, or any other attribute. For example, the user could filter all software installed within a certain time frame, or all the fixes or enhancement applied during a particular installation.

Figure 3:
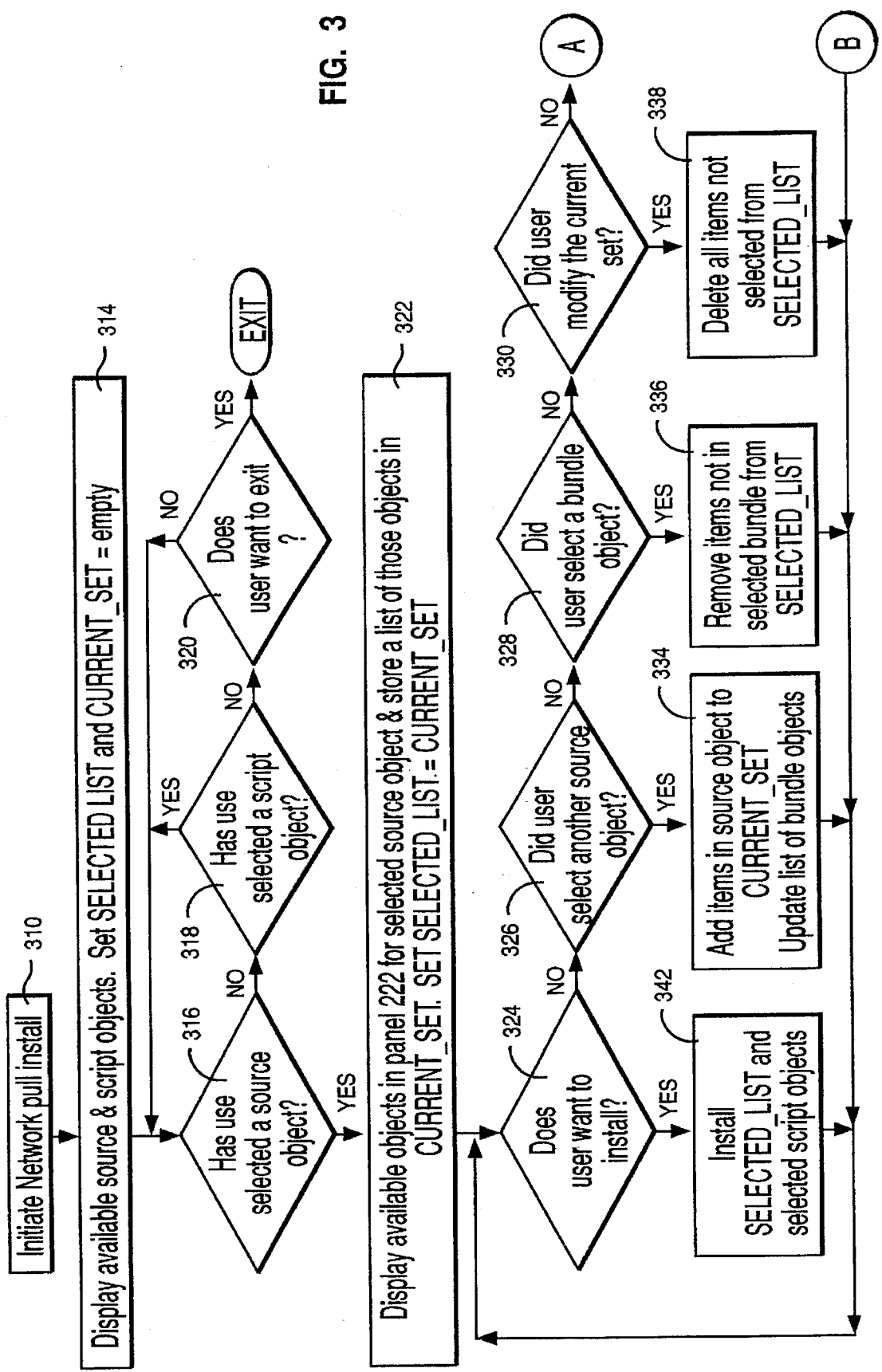
FIG. 3 is a flow diagram of detailed logic for installing software in accordance with the present invention.
Figure 4:
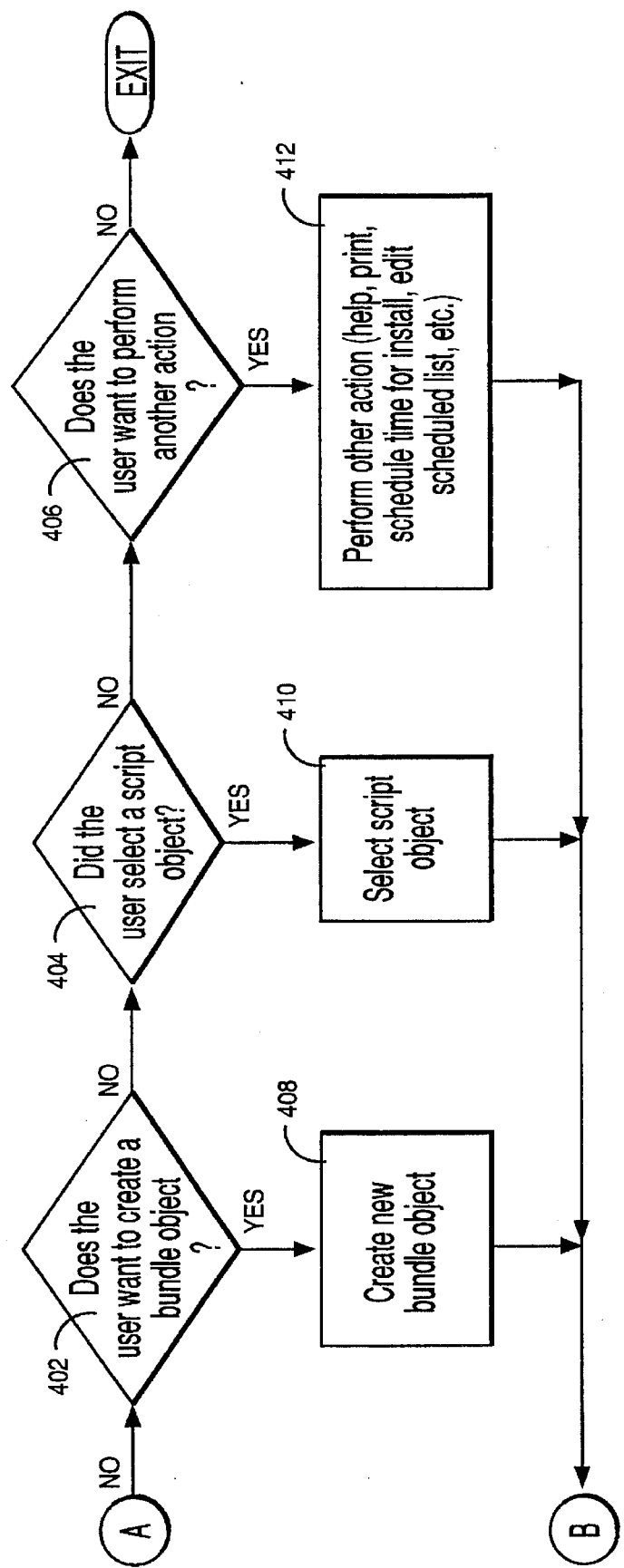
FIG. 4 is an extension of FIG. 3 and includes detailed logic for installing software in accordance with the present invention.

FIGS. 3 and 4 illustrate detailed logic for installing software over a network using the graphical user interface display illustrated in FIG. 2. Referring to FIG. 3, at 310, the GUI receives a command from user controls to initiate a network pull install. At 314, the GUI searches a database within the GUI to locate and then display all available source objects and script objects for the local machine. As a result, the display illustrated in FIG. 2 appears on the display, except that no icons will be initially selected. Alternatively, the GUI could have a default selection. These objects may be designated by a network system administrator. Therefore, the user of the local machine only views software item icons that he/she can access. The GUI then sets a CURRENT_SET array and a SELECTED_LIST array to empty. The CURRENT_SET array contains a list of all installable software items of all selected source objects from panel 210. Panel 240 displays the CURRENT_SET. The SELECTED_LIST contains a list of all selected software items, if any, from the CURRENT_SET that will actually be installed. Therefore, the SELECTED_LIST is either equal to the CURRENT_SET (i.e., no software items have been selected/highlighted) or is a subset of the CURRENT_SET. The highlighted (i.e., selected) software items in panel 240 represent the SELECTED_LIST.

At 316, the GUI determines if the user has selected a source object from panel 210. If so, the GUI stores the name of all installable software items that the user may access in the CURRENT_SET and sets the SELECTED_LIST equal to the CURRENT_SET. The GUI also displays in panel 220 available bundle objects that reference one or more software items in the CURRENT_SET.

Returning to 316, if the user has not selected a source object, at 318, the GUI determines if the user has selected a script object. If not, the user may exit at 320. If so, control is directed to 324.

At 324, the GUI determines if the user desires to initiate an install. The user may do so by clicking install button 260 (see FIG. 2). If the user does not currently wish to install the selected software, the user may select from a variety of options. For example, at 326, the GUI determines if the user selected an additional source object from panel 210. If the user did select another source object, at 334, the GUI adds the software items in the newly selected source object to the CURRENT_SET and displays the CURRENT_SET in panel 240. The GUI also displays in panel 220 any additional bundle objects that are available/reference (e.g., contain a pointer to) the new CURRENT_SET.

If the user did not select another source object, at 328, the GUI determines if the user selected a bundle object from panel 220. If the user selected a bundle object, at 336, the GUI de-selects any software items not listed in the bundle object and removes them from the SELECTED_LIST. The GUI also highlights all software items in the bundle object that are displayed in panel 240.

At 330, the GUI determines if the user modified the SELECTED_LIST via selecting or de-selecting software items in panel 240. If the user did modify the contents of panel 240, the GUI removes any software items not selected by the user from the SELECTED_LIST array. If the user did not modify panel 240, at 402 (see FIG. 4), the GUI determines if the user desires to create a bundle object. To do this, the GUI detects a click by user controls over button 266 (see FIG. 2). As a result, any selected software items in panel 240 will become a new bundle and is stored in a database in the GUI at 408. The user is then prompted for the name of the new bundle. After these steps, the SELECTED_LIST array represents the intersection of the software items in the selected source object (e.g., 212) and the selected software items in panel 240.

At 404, the GUI determines if the user selected a script object. To do this, the GUI detects a click by the user over a script icon in panel 230 and, if selected, selects and executes that script object at 410. At 406, the GUI determines if the user desires to perform other actions and, if so, at 412, performs those actions (e.g., help, print, schedule a specific time in the future to install, edit scheduled list, etc.). Control then returns to 324 in FIG. 3.

At 324, the GUI determines if the user desires to install software by detecting a click over install button 260. If detected, control is directed to 342 where the GUI directs the CPU(s) to perform an installation of all software items in SELECTED_LIST on a specified hard drive of the locale machine.

We claim:

1. A computer-implemented method for installing software located on a second machine to a first machine in a distributed computing network, the first machine having at least a display, processor, and user controls, comprising the steps of:

displaying on the display source objects of the second machine embodying first software items that are installable on the first machine;

in response to a selection by user controls of at least one displayed source object, displaying software bundle objects having second software items, each bundle object having at least one second software item in common with a first software item in the selected source object; and in response to a selection of at least one software bundle object, installing on the first machine an intersection of the first software items and the second software items.

2. The method according to claim 1 further comprising the step of:

in response to a selection of at least one software bundle object, displaying representations of the second software items for selection; and in response to selecting at least one second software items, installing only the second selected software items.

3. The method according to claim 1 wherein the step of displaying on the display source objects of the second machine comprises the step of searching a database to locate and display all available source objects that are installable on the first machine.

4. The method according to claim 1 further comprising the step:

in response to not selecting at least one bundle object, installing on the first machine the first software items.

5. A computer system for installing software embodied within a second machine on a first machine in a distributed computing network, the first machine having at least a display, processor, means for controlling the display, and user controls, comprising:

the display for displaying source objects of the second machine embodying first software items that are installable on the first machine;

in response to a selection by the user controls of at least one displayed source object, the display for displaying software bundle objects having second software items, each bundle object having at least one second software item in common with a first software item in the selected source object; and in response to a selection of at least one software bundle object by the user controls, the processor for installing on the first machine an intersection of the first software items with the second software items.

6. The computer system according to claim 5 further comprising:

in response to a selection of at least one software bundle object by the user controls, the display for displaying representations of the second software items embodied within the software bundle for de-selection; and in response to selecting the second software items by the user controls, the processor for installing on the first machine only the selected second software.

7. The computer system according to claim 5 wherein the processor searches a database to locate and display all available source objects that are installable on the first machine.

8. The computer system according to claim 5 further comprising:

in response to not selecting at least one bundle object, the processor for installing on the first machine the first software items.

* * * * *

UNITED STATES PATENT AND TRADEMARK OFFICE
CERTIFICATE OF CORRECTION

| | |
|---|---|
| PATENT NO. : | 5,666,501 |
| DATED : | Sept. 9, 1997 |
| INVENTOR(S) : | Jones et al. |

It is certified that error appears in the above-indentified patent and that said Letters Patent is hereby corrected as shown below:

IN THE DRAWINGS:

In Figure 2, box 220, please change Reference No. "212" to --222--

In Figure 3, box 316, please change "use" to --user--; and in box 322, please change Reference No. "222" to --220--.

Signed and Sealed this

Seventeenth Day of February, 1998

Attest:

BRUCE LEHMAN

Attesting Officer

Commissioner of Patents and Trademarks